(12) United States Patent
Hatakeyama et al.

(10) Patent No.: US 8,565,524 B2
(45) Date of Patent: Oct. 22, 2013

(54) IMAGE PROCESSING APPARATUS, AND IMAGE PICKUP APPARATUS USING SAME

(75) Inventors: Koshi Hatakeyama, Tokyo (JP);
Nobuhiko Tamura, Tokyo (JP);
Tsunefumi Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/371,173

(22) Filed: Feb. 10, 2012

(65) Prior Publication Data

US 2012/0141027 A1   Jun. 7, 2012

Related U.S. Application Data

(63) Continuation of application No. PCT/JP2010/055858, filed on Mar. 31, 2010.

(51) Int. Cl.
*G06K 9/00* (2006.01)

(52) U.S. Cl.
USPC ............ 382/167; 382/162; 382/274; 382/159

(58) Field of Classification Search
USPC .......... 382/159, 162, 167, 274, 300; 250/307, 250/310, 311; 348/241, 222.1, 242
See application file for complete search history.

(56) References Cited

U.S. PATENT DOCUMENTS

| | | | | |
|---|---|---|---|---|
| 2003/0184663 A1* | 10/2003 | Nakano et al. | ............... | 348/241 |
| 2010/0079626 A1* | 4/2010 | Hatakeyama | ............... | 348/241 |
| 2012/0126117 A1* | 5/2012 | Nakahira et al. | ............... | 250/310 |

FOREIGN PATENT DOCUMENTS

| | | | |
|---|---|---|---|
| JP | 2007-183842 A | | 7/2007 |
| JP | 2009-010847 A | | 1/2009 |
| JP | 2009-021905 A | | 1/2009 |
| JP | 2009-289079 A | | 12/2009 |
| JP | 2010-068361 A | | 3/2010 |

* cited by examiner

*Primary Examiner* — Ali Bayat
(74) *Attorney, Agent, or Firm* — Canon U.S.A., Inc. IP Division

(57) ABSTRACT

To provide an image processing apparatus capable of obtaining a high-quality image, an image processing apparatus of the present invention includes an image restoration processing unit configured to perform a restoration process on an input image and generate a restored image, a difference information generating unit configured to calculate difference information between the restored image and the input image, an adjustment coefficient setting unit configured to be capable of setting a plurality of different adjustment coefficients for the input image, a correction difference information generating unit configured to generate correction difference information on the basis of the adjustment coefficients and the difference information, and a combining unit to combine the correction difference information with the input image and generate a restoration adjusted image.

9 Claims, 14 Drawing Sheets

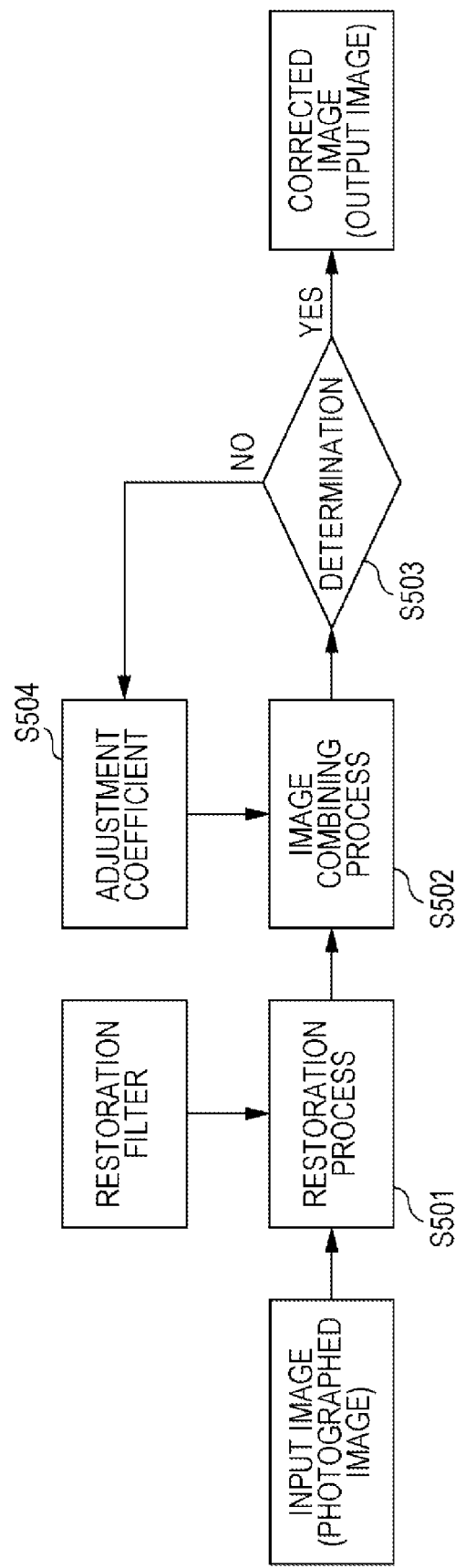

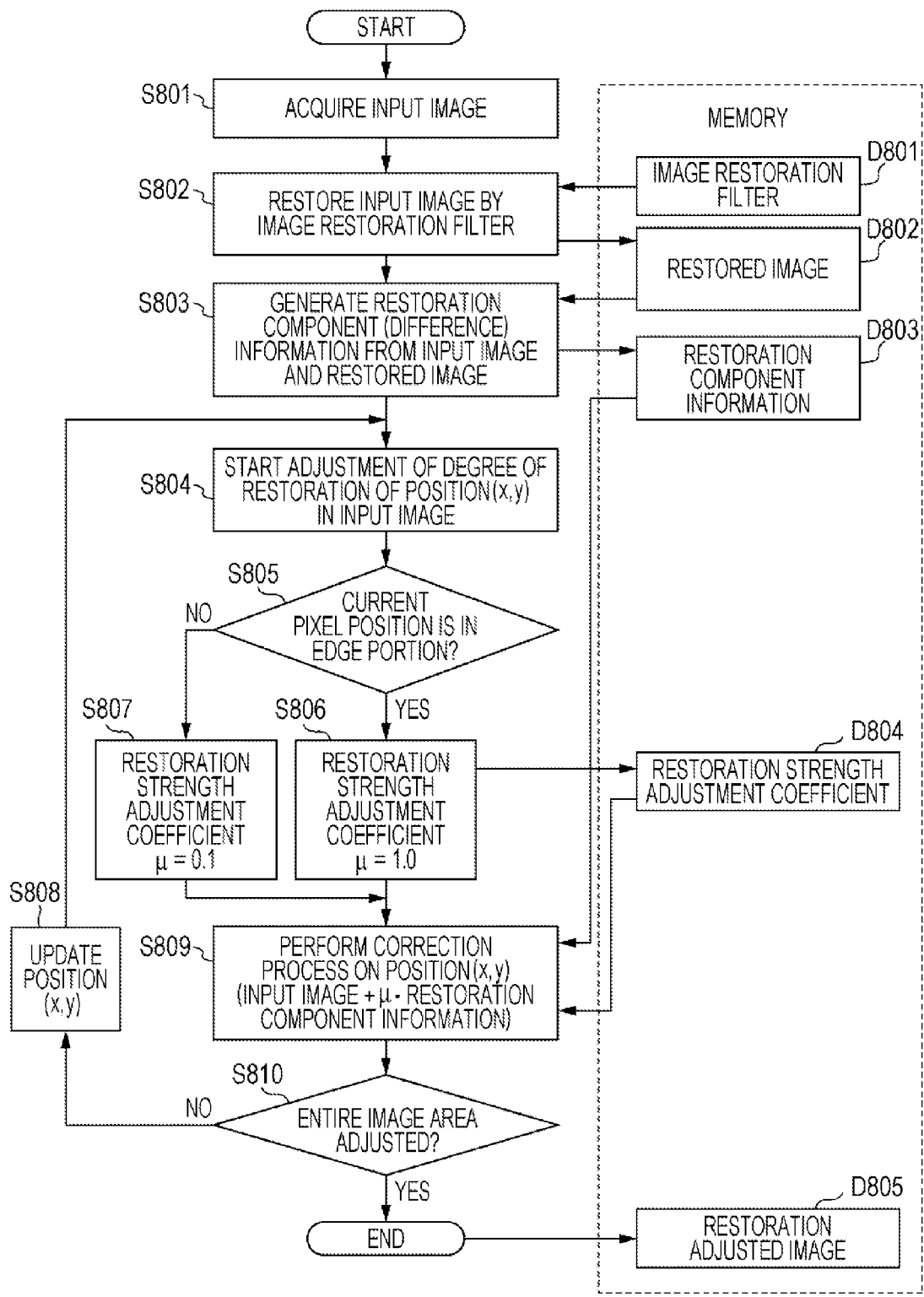

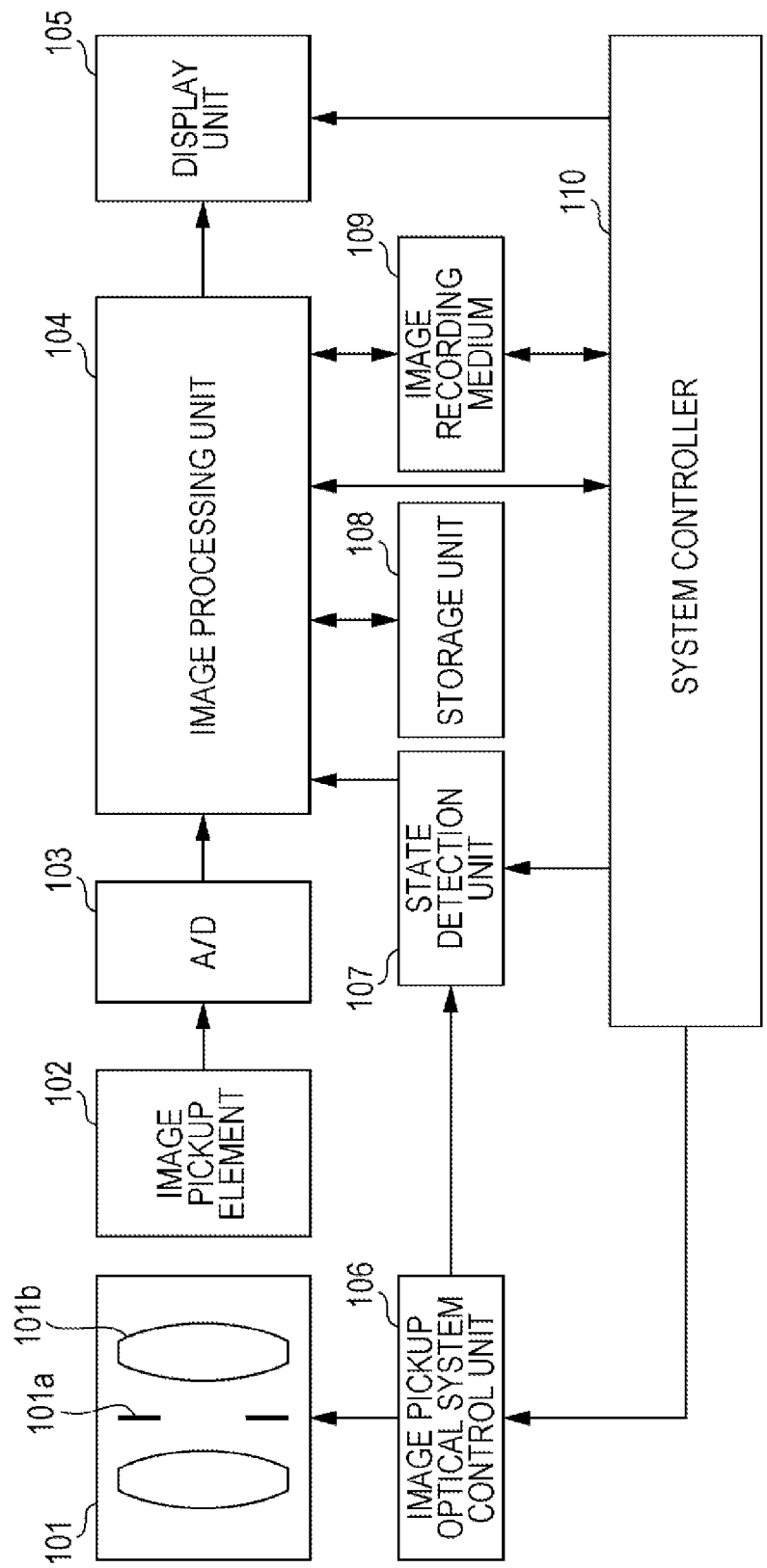

IMAGE PROCESSING APPARATUS, AND IMAGE PICKUP APPARATUS USING SAME

CROSS-REFERENCE TO RELATED APPLICATIONS

This application is a Continuation of International Patent Application No. PCT/JP2010/055858, filed Mar. 31, 2010, which is hereby incorporated by reference herein in its entirety.

TECHNICAL FIELD

The present invention relates to image processing apparatuses that perform image processing, and more specifically to an image processing apparatus that performs image restoration (recovery).

BACKGROUND ART

Images obtained by image pickup apparatuses such as digital cameras are degraded in quality because of blurring. Image blur is caused by spherical aberration, coma aberration, curvature of field, astigmatism, and the like of image pickup systems.

One known method for correcting such image blur is to correct image blur using information about the optical transfer function (OTF) of an image pickup system. This method is called the term image restoration or image recovery. The process for correcting a degraded image using information about the optical transfer function of an image pickup system is hereinafter referred to as an image restoration process.

One known image restoration filter (filter) used for the image restoration process is a Wiener filter that controls a degree of restoration in accordance with the intensity ratio of an image signal to a noise signal (SNR).

PTL 1 discloses an image restoration filter which is an application of a Wiener filter and which is capable of changing the degree of restoration of an image in a range from a filter that outputs an input image as it is to a filter that maximally performs image restoration, by adjusting an adjustment parameter α for the filter.

CITATION LIST

Patent Literature

PTL 1: Japanese Patent Laid-Open No. 2007-183842

However, the uniform processing of an entire image using a conventional Wiener filter or the image restoration filter described in PTL 1 leads to over-restoration of a pixel whose pixel value is smaller than an average value, which results in increased noise, and conversely to under-restoration of a pixel whose pixel value is larger than the average value. Therefore, a high-quality image cannot be obtained.

Accordingly, it is an object of the present invention to provide an image processing apparatus capable of obtaining a high-quality image.

SUMMARY OF INVENTION

To achieve the above object, the image processing apparatus of the present invention includes an image restoration processing unit configured to perform a restoration process on an input image and generate a restored image;

a difference information generating unit configured to calculate difference information between the restored image and the input image;

an adjustment coefficient setting unit configured to be capable of setting a plurality of different adjustment coefficients for the input image;

a correction difference information generating unit configured to generate correction difference information on the basis of the adjustment coefficients and the difference information; and a combining unit configured to combine the correction difference information with the input image and generate a restoration adjusted image.

Further features of the present invention will become apparent from the following description of exemplary embodiments with reference to the attached drawings.

BRIEF DESCRIPTION OF DRAWINGS

FIG. 5 is a flowchart illustrating an image processing method according to an exemplary embodiment.

FIG. 8A is a flowchart illustrating an example of an image processing procedure based on a feature value of a pixel.

FIG. 9 is a block diagram illustrating a basic configuration of an image pickup apparatus.

DESCRIPTION OF EMBODIMENTS

Exemplary embodiments of the present invention will be described with reference to the drawings. Prior to the description of specific exemplary embodiments, image processing techniques used in the respective exemplary embodiments will be initially described.

Figure 1:
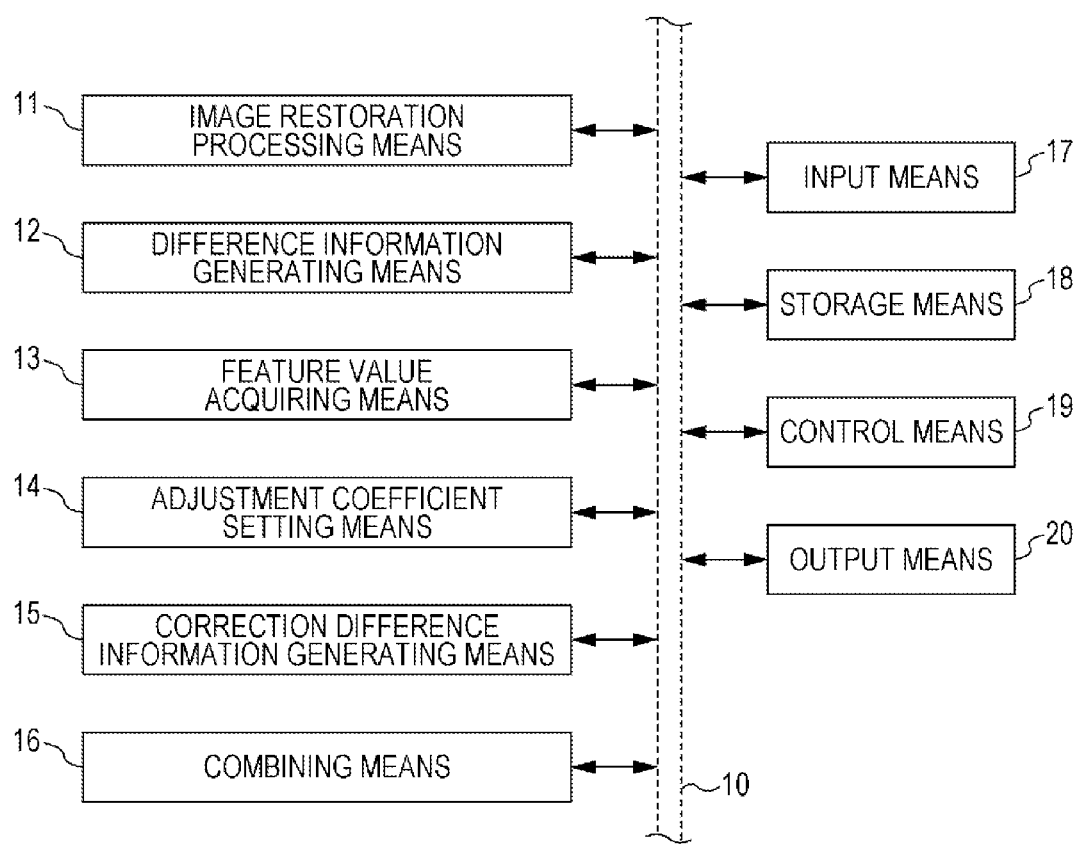
FIG. 1 is a block diagram illustrating a functional configuration of an image processing apparatus.

Main functions of image processing according to the present invention will be described using a functional block diagram illustrated in FIG. 1. An image restoration processing means 11 performs a restoration (recovery) process on an acquired input image (degraded image), and generates a restored image. A difference information generating means 12 calculates the difference between the input image and the restored image, and acquires (generates) difference information. A feature value acquiring means 13 acquires a feature value of a pixel in the input image or the restored image. An adjustment coefficient setting means 14 acquires from a storage means 18 an adjustment coefficient for adjusting the degree of restoration of the image. A correction difference information generating means 15 generates correction difference information on the basis of the adjustment coefficient and the difference information. A combining means 16 combines the correction difference information with the input image. As a result of the series of processes described above, a restoration adjusted image (output image, corrected image) is obtained. In each of the processes, data of the image and the like is exchanged via a connecting means 10 such as a bus. Other means such as an input means 17, the storage means 18, a control means 19 for controlling each function, and an output means 20 illustrated in FIG. 1, are provided, if necessary. The storage means 18 stores an input image, an image restoration filter, a restored image, difference information, a pixel feature value or data related thereto, an adjustment coefficient, correction difference information, etc.

Figure 2:
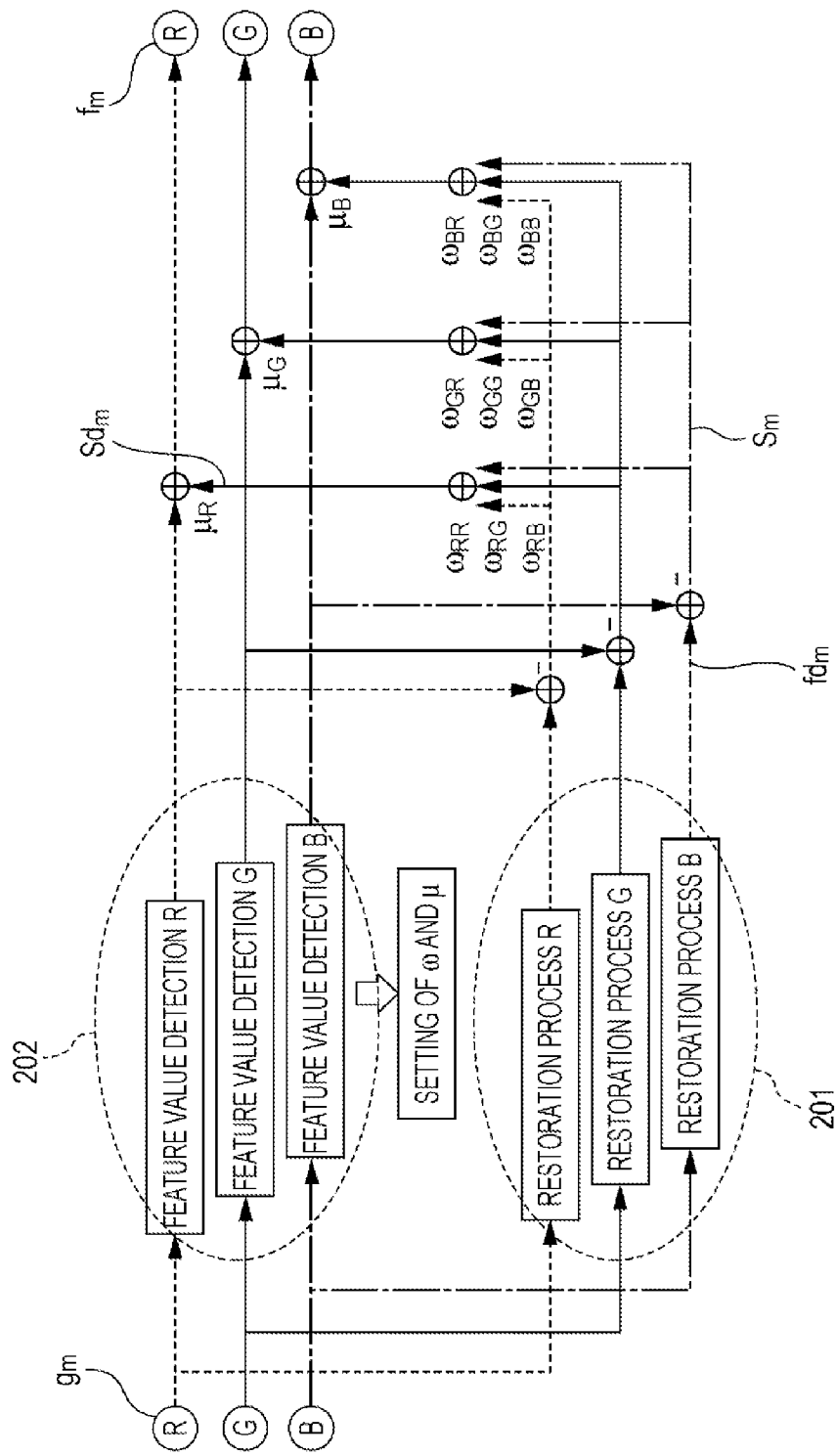
FIG. 2 is an explanatory diagram of an image processing method according to an exemplary embodiment of the present invention.

The image processing method described above will be described using FIG. 2. In FIG. 2, symbols g, f, fd, S, and Sd represent images obtained in the individual processing steps, and sign m represents a color component of an image. For example, when image information about a certain pixel A in an image is composed of R, G, and B (red, blue, and green) color components, $A_m$, that is, $(A_R, A_G, A_B)$, represents (R component of A, G component of A, B component of A). The following description will be given in the context of an image having a plurality of colors, particularly, R, G, and B colors. However, the input image may be a single-color image.

(Input Image $g_m$)

An input image $g_m$ is a digital image obtained by receiving light at an image pickup element through an image pickup system (image pickup optical system, image pickup lens), and has been degraded by an optical transfer function (OTF) based on the aberration of an image pickup system including a lens, various optical filters, etc. Instead of the lens, the image pickup system can include a mirror (reflection surface) having a curvature.

It is to be noted that an image processing method according to an exemplary embodiment of the present invention can also be applied to, for example, input images generated by an image pickup system that does not include an image pickup optical system. For example, an image pickup apparatus that performs image pickup with an image pickup element in close contact with an object surface, such as a scanner (reading device) or an X-ray image pickup apparatus, does not have an image pickup optical system such as a lens. Images generated by image sampling based on an image pickup element are degraded to some extent. In this case, degradation characteristics are not due to the optical transfer function (optical transfer function in narrow sense) of the image pickup optical system but due to the system transfer function of the image pickup system, and this system transfer function can be equivalent to an optical transfer function (OTF). For this reason, the term "optical transfer function", as used in the exemplary embodiments of the present invention, is an optical transfer function in broad sense including a system transfer function of such an image pickup system that does not include an image pickup optical system.

The input image $g_m$ obtained through the image pickup system may be a mosaic image (RAW image) in which one pixel has a signal value of one color component, or may be a demosaiced image in which one pixel has signal values of a plurality of color components. The demosaiced image may be obtained by performing a color interpolation process (demosaicing process) on a mosaic image. While the mosaic image and demosaiced image described above are different in the way how to have a color component, in both images, one pixel can have a plurality of color components.

A method for acquiring an input image $g_m$ having a plurality of color components is taken as an example. In order to obtain information about a plurality of color components using a single-plate image pickup element, a color filter having a different spectral transmittance is disposed in each of the pixels of the image pickup element, and a mosaic image is acquired in which one pixel has a signal value of one color component. In contrast, in order to obtain an input image $g_m$ using a multiple-plate, for example, three-plate, image pickup element, a color filter having a different spectral transmittance is disposed in each image pickup element. Therefore, a signal value of a different color component for each image pickup element can be obtained. In this case, an input image $g_m$ having signal values of a plurality of color components for one pixel can be acquired without particularly performing a color interpolation process.

The input image $g_m$ can further have image pickup states such as the zoom position (focal length) of the lens (image pickup system), the aperture value, and the object distance (focus distance), and information (correction information) such as a feature value of a pixel. The details of the correction information will be described below.

(Image Restoration Process)

Next, image restoration processes (restoration processes) 201 surrounded by a broken line in FIG. 2 will be described. A restoration process R, a restoration process G, and a restoration process B are substantially the same, and these restoration processes are processes for performing convolution (convolution integral, sum of products) on each of the pixels of the input image $g_m$ using an image restoration filter. The image restoration filter can be obtained through an inverse Fourier transform of a function generated based on the inverse function of the transfer function of the image pickup system.

If low-accuracy restoration is demanded or if only an image on which some image processing operations have been performed can be obtained, a restoration process may be performed on a demosaiced image. However, preferably, a restoration process is performed on a mosaic image because the input image $g_m$ on which no non-linear processing has been performed allows higher accuracy image restoration.

Through the restoration processes, a restored image $fd_m$ with enhanced image sharpness is generated. If the restored image $fd_m$ has the desired image quality, the restored image $fd_m$ may be used as an output image $f_m$. However, if the desired image quality is not met, such as if color fringing (false color) has occurred in the restored image $fd_m$ or if the sharpness (degree of restoration) of the restored image $fd_m$ is to be changed, a correction process which will be described hereinafter is performed.

Here, a complementary description will be given of color fringing (false color). Color fringing is an artifact that can be generated by a restoration process, and increasing the degree of restoration of an image by performing a restoration process makes color fringing (false color) appear noticeable instead of improves sharpness. This event can occur when an image restoration filter configured to correct anticipated degradation characteristics is used for an image having degradation characteristics different from anticipated degradation characteristics. This event often occurs in an edge portion of the like in an image.

(Correction Process, Color Combination Ratio Adjustment Coefficient)

In a correction process, first, as in Expression 1, the input image $g_m$ is subtracted from the restored image $fd_m$ for each pixel of each color component to generate restoration component information $S_m$ (difference information).

$$S_m = fd_m - g_m \quad \text{(Expression 1)}$$

The generated restoration component information $S_m$ is multiplied by a color combination ratio adjustment coefficient $\omega$ expressed by a matrix to generate color combination restoration component information $Sd_m$ (correction difference information) (Expression 2). If the input image has color components of three colors R, G, and B, the color combination ratio adjustment coefficient $\omega$ is a matrix having 3×3 coefficient elements.

$$Sd_m = \sum_n^{RGB} \omega_{mn} S_n \quad \text{(Expression 2)}$$

In Expression 2, $\omega_{mn}$ represents a coefficient by which a second color component n is multiplied in order to generate color combination restoration component information $Sd_m$ about a first color component m. $\Sigma$ for n represents the sum of $\omega_{mn} S_n$ regarding R, G, and B. For example, color combination restoration component information $Sd_R$ for R is generated by combining $\omega_{RR} S_R$, $\omega_{RG} S_G$, and $\omega_{RB} S_B$ obtained by multiplying the signal values of the respective pixels of restoration component information $S_R$ for R, restoration component information $S_G$ for G, and restoration component information $S_B$ for B by color combination ratio adjustment coefficients $\omega_{RR}$, $\omega_{RG}$, and $\omega_{RB}$, respectively. The expansion of Expression 2 for the color components m and n is given in Expression 3.

$$\begin{pmatrix} Sd_R \\ Sd_G \\ Sd_B \end{pmatrix} = \begin{pmatrix} \omega_{RR} & \omega_{RG} & \omega_{RB} \\ \omega_{GR} & \omega_{GG} & \omega_{GB} \\ \omega_{BR} & \omega_{BG} & \omega_{BB} \end{pmatrix} \begin{pmatrix} S_R \\ S_G \\ S_B \end{pmatrix} \quad \text{(Expression 3)}$$

Next, a method for setting (selecting) the nine color combination ratio adjustment coefficients $\omega$ in Expression 3 will be described using a specific example.

A first example is a color combination ratio adjustment coefficient $\omega$ for obtaining, as a corrected image $f_m$, the same image as the restored image $fd_m$. It is assumed that the elements in the principal diagonal of the color combination ratio adjustment coefficient $\omega$ in Expression 3 are 1 and the remaining components are 0 (unit matrix). Thus, the color combination restoration component information $Sd_m$ is equal to the restoration component information $S_m$ on the color component m thereof, and an image with a high sharpness (high degree of restoration) can be obtained as a corrected image $f_m$.

A second example is a color combination ratio adjustment coefficient $\omega$ for preventing the occurrence of color fringing. It is assumed that all the elements of the color combination ratio adjustment coefficient $\omega$ in Expression 3 are set to ⅓. Thus, the color combination restoration component information $Sd_m$ is equal to the average of the restoration component information $S_R$, the restoration component information $S_G$, and the restoration component information $S_B$ on all the color components. Even if $S_R$, $S_G$, and $S_B$ differ, the color combination restoration component information $Sd_R$, the color combination restoration component information $Sd_G$, and the color combination restoration component information $Sd_B$ have the same value. When the color combination restoration component information $Sd_m$ is equal for all the color components, this means no difference in additional information regarding the color components when combining the color combination restoration component information $Sd_m$ with the input image $g_m$ in the following step. Thus, occurrence of color fringing in the image can be prevented or reduced. Additionally, even if the restoration component information $S_m$ is averaged, positive correlation (similarity) is found to some extent between the restoration component information $S_R$, the restoration component information $S_G$, and the restoration component information $S_B$ on the respective color components. Thus, the sharpness of the corrected image $f_m$ can also be improved.

That is, by adjusting the color combination ratio adjustment coefficient $\omega$, it is possible to adjust the balance between color fringing and the degree of restoration (sharpness) and obtain an image having desired image quality.

Then, color combination restoration component information $Sd_m$ obtained in Expressions 2 and 3 is combined with the original input image $g_m$ for each color component. Thus, a corrected image $f_m$ (output image $f_m$) is generated.

$$f_m = g_m + Sd_m = g_m + \sum_n^{RGB} \omega_{mn}(fd_n - g_n) \quad \text{(Expression 4)}$$

Through the image processing described above, an image with the improvement in sharpness and the reduction of color fringing, which may occur by image restoration, can be obtained. The image processing is useful particularly when there is a difference between an optical transfer function (OTF) in the actual photographic condition and the optical transfer function (OTF) assumed when an image restoration filter is created.

Another advantageous effect is as follows. With the use of difference information between an input image and a restored image and a color combination ratio adjustment coefficient $\omega$ (adjustment coefficient), the degree of restoration can be changed without the recalculation of an image restoration filter. Therefore, a high-quality image can be obtained with reduced image processing load.

While a color combination ratio adjustment coefficient $\omega$ (Expression 3) having nine degrees of freedom of setting has been described, it may be bothersome to set each coefficient element value because the degree of freedom of setting is high. Accordingly, an example of a method for more easily setting a color combination ratio adjustment coefficient $\omega$ will be presented hereinafter.

First, two constraint conditions are added to the color combination ratio adjustment coefficient $\omega$. The first constraint condition is that, as in Expression 5, the sum for each row of the matrix $\omega$ in Expression 3 is set to 1.

$$\sum_n^{RGB} \omega_{mn} = 1 \quad \text{(Expression 5)}$$

This constraint condition means, for example, the normalized mixing ratio of the restoration component information $S_R$, the restoration component information $S_G$, and the restoration component information $S_B$ for generating the color combination restoration component information $Sd_R$ on the R color component. In this manner, normalizing the mixing ratio makes it easy to compare the weighting rates of different pieces of color combination restoration component information $Sd_m$.

The second condition is that, as in Expression 6, the sum for each column of the matrix ω given in Expression 3 is set to 1.

$$\sum_{m}^{RGB} \omega_{mn} = 1 \quad \text{(Expression 6)}$$

This constraint condition means that when the color combination restoration component information $Sd_R$, the color combination restoration component information $Sd_G$, and the color combination restoration component information $Sd_B$ are generated, the restoration component information $S_R$, the restoration component information $S_G$, and the restoration component information $S_B$ are distributed to the respective color components and are completely used.

A color combination ratio adjustment coefficient ω satisfying the above two constraint conditions can be expressed as Expression 7.

$$\omega = \begin{pmatrix} \omega_{RR} & 1 - \omega_{GG} - \omega_{BG} & \omega_{RB} \\ \omega_{GR} & \omega_{GG} & 1 - \omega_{BB} - \omega_{RB} \\ 1 - \omega_{RR} - \omega_{GR} & \omega_{BG} & \omega_{BB} \end{pmatrix} \quad \text{(Expression 7)}$$

Further, in order to reduce color fringing while preventing the reduction in the intensity of the degree of restoration, it is preferable that the difference in color combination restoration component information $Sd_m$ between the color components be smaller. That is, it is desirable that the variance of each column in Expression 7 be small. If the variance of each column is minimized, the coefficients in the Expression 7 can be rewritten as Expression 8.

$$\omega = \begin{pmatrix} \omega & (1 - \omega)/2 & (1 - \omega)/2 \\ (1 - \omega)/2 & \omega & (1 - \omega)/2 \\ (1 - \omega)/2 & (1 - \omega)/2 & \omega \end{pmatrix} \quad \text{(Expression 8)}$$

With the above constraint conditions, a single setting parameter can be used, thus making it possible to easily control the adjustment of the balance between the degree of restoration and a risk of generating color fringing (false color). In Expression 8, if ω=1, the matrix ω is a unit matrix, and the degree of restoration becomes maximum. If ω=⅓, all the elements of the matrix ω are ⅓, and the risk of generating false color can be reduced.

Another advantageous effect is as follows. The ability to control a preferred adjustment parameter with a small degree of freedom also allows the provider of an image pickup apparatus or an image processing apparatus to improve the efficiency of work in the apparatus development step or production step.

Another advantageous effect is as follows. For example, if all the elements of the matrix ω are set to 0 (zero), the color combination restoration component information $Sd_m$ is set to 0 (zero) for all the color components. Thus, the corrected image $f_m$ becomes the input image $g_m$ itself. The corrected image $f_m$ can be made the same as the input image $g_m$. This is important in terms of system safety because at least the original photographed image can be reproduced when it is difficult to obtain a high-quality restored image due to some reason.

Furthermore, the color combination ratio adjustment coefficient ω may be adjusted in a range which is not limited to ⅓≤ω≤1 but 0≤ω≤1. Therefore, images ranging from the input image $g_m$ to an image with the highest degree of restoration can be acquired by adjusting a single parameter. Moreover, sharpness can also be further enhanced by setting the value in the right side of Expression 5 to be larger than 1. The number of degrees of freedom of setting of each element of the matrix ω is not limited to one, and the adjustment can be performed with nine degrees of freedom or a reduced number of degrees of freedom based on another constraint condition. For example, the number of degrees of freedom can be set to 6 based on Expression 7.

Another advantageous effect is as follows. Difference information is calculated for the input image in accordance with the color combination ratio adjustment coefficient ω. There is no need to generate an image restoration filter again when the degree of restoration is to be altered. Thus, image processing load can be reduced.

Another advantageous effect is as follows. In general, it is necessary to hold a large number of image restoration filters in order to obtain a high-quality restored image. However, the present invention enables the generation of a high-quality image while preventing an increase in the amount of data.

(Corrected Image Processing, Restoration Strength Adjustment Coefficient)

Next, a process using a restoration strength adjustment coefficient μ (adjustment coefficient) will be described. The restoration strength adjustment coefficient μ is a coefficient that defines the amount of calculation (amount of addition or amount of subtraction) of difference information $Sd_m$ for the input image $g_m$. Although it has been described that the corrected image $f_m$ is obtained using Expression 4, the process expressed in Expression 9 is performed here. In Expression 9, the matrix ω determined by Expression 8 is multiplied by the restoration strength adjustment coefficient μ to obtain a corrected image $f_m$.

$$f_m = g_m + \mu Sd_m = g_m + \mu \sum_{n}^{RGB} \omega_{mn}(fd_n - g_n) \quad \text{(Expression 9)}$$

If μ=0, then the second term in the right side of Expression 9 is 0 (zero). Thus, the input image $g_m$ itself can be obtained as a corrected image $f_m$. If μ=1, then Expression 9 equals Expression 3, and a corrected image $f_m$ having the degree of restoration determined by the color combination ratio adjustment coefficient ω in Expression 8 can be obtained. The basic range of the restoration strength adjustment coefficient μ is 0≤μ≤1. If μ>1, a corrected image $f_m$ with enhanced sharpness can also be obtained.

For the restoration strength adjustment coefficient μ, similarly to the color combination ratio adjustment coefficient ω, the degree of restoration can be easily adjusted on a pixel-by-pixel basis. A high-quality image can be obtained.

Expression 10 is an expression when the restoration strength adjustment coefficient μ is changed for each color component.

$$f_m = g_m + \mu_m Sd_m = g_m + \mu_m \sum_{n}^{RGB} \omega_{mn}(fd_n - g_n) \quad \text{(Expression 10)}$$

As in Expression 10, changing the restoration strength adjustment coefficient μ for each color component allows the degree of restoration (the amount of calculation of difference information) to be adjusted for each color component. This is effective to adjust the intensity of the degree of restoration for each color component when the optical transfer function (OTF) varies for each color component and then the balance of chromatic aberration varies due to the factors such as the spectral variation of a light source that illuminates the object or manufacturing errors of the image pickup system. More specifically, changing the spectral characteristics of an illumination light source is equivalent to changing the intensity ratio for each wavelength. Thus, the amount of aberration changes for each color component. Therefore, a corrected image $f_m$ suitable for each color component can be obtained by setting the restoration strength adjustment coefficient $\mu$ for each color component in accordance with the spectral characteristics during photographing.

Another advantageous effect of using the restoration strength adjustment coefficient $\mu$ is to provide the ability to perform image processing that meets various restoration requirements. For example, in a portrait, noise and ringing are very obstructive. Here, if it is assumed that maximum restoration is obtained when $\mu=1$, it is possible to reduce noise and ringing by setting the restoration strength adjustment coefficient $\mu$ to a value smaller than 1. Meanwhile, when users wish to read a number from a number plate of a vehicle using a monitor camera or the like, noise and ringing become large while numbers can be easily identified by setting the restoration strength adjustment coefficient $\mu$ to a value larger than 1.

Further, if the restoration strength adjustment coefficient $\mu=0$, similarly to the color combination ratio adjustment coefficient $\omega$, when an ill effect such as noise, ringing, or false color largely appears in an image due to some reason, at least a photographed image (input image) itself can be output as an output image. Therefore, system safety can be high.

Furthermore, in general photograph shooting, the image quality required for the output image $f_m$ depends upon the user or object, ranging from a soft-focus image with the presence of flare due to the remaining aberration to a sharp image from which the aberration has been removed. Even such various requirements can also be met by adjusting the restoration strength adjustment coefficient $\mu$.

Another advantageous effect is as follows. The separation of the color combination ratio adjustment coefficient $\omega$ and the restoration strength adjustment coefficient $\mu$ allows the balance between the degree of restoration and the risk of generating false color to be adjusted using the color combination ratio adjustment coefficient $\omega$, and allows the degree of restoration for a certain color combination ratio adjustment coefficient $\omega$ to be adjusted using the restoration strength adjustment coefficient $\mu$. This facilitates image processing based on a parameter suitable for demands such as reduced color fringing and improved sharpness.

The set values of the adjustment coefficients, i.e., the color combination ratio adjustment coefficient $\omega$ and the restoration strength adjustment coefficient $\mu$, can also be changed in accordance with other setting information regarding a change in SN ratio, such as setting the ISO sensitivity. The set values can also be changed as desired in a compound manner in accordance with pixel values and differences therebetween (a feature value of pixels), and image pickup states such as zoom position (focal length), object distance (focus distance), and aperture value, or in combination with the above challenges for mitigation of manufacturing errors, and can be used.

Figure 3:
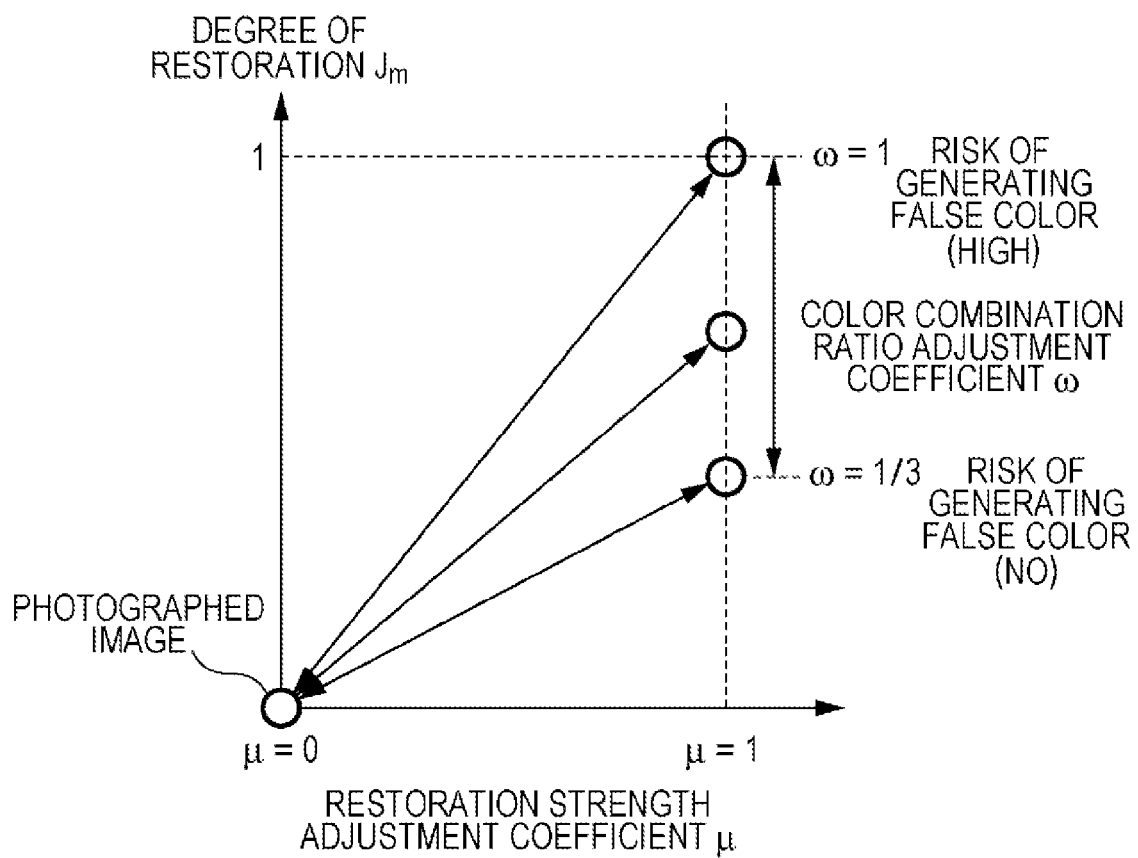
FIG. 3 is a first explanatory diagram of linearity of adjustment coefficients.

Here, the linearity of the degree of restoration of the corrected image $f_m$ with respect to a change in the color combination ratio adjustment coefficient $\omega$ and the restoration strength adjustment coefficient $\mu$ will be described using FIG. 3. A corrected image $f_m$ with the maximum degree of restoration in which the color combination ratio adjustment coefficient $\omega$ in Expression 8 and the restoration strength adjustment coefficient $\mu$ are set to 1 is used as a reference. The image similarity between the restored image $fd_m$ and the corrected image $f_m$ is defined as an evaluation function $J_m$ in Expression 11.

$$J_m = \frac{\|fd_m - f_m\|_2}{\sqrt{XY}} \quad \text{(Expression 11)}$$

The double vertical line symbol with sign 2 in the right side represents a two-dimensional norm, the denominator X, Y represents the number of pixels in the horizontal and vertical directions of an image. Substituting Expression 9 as the corrected image $f_m$ and Expression 8 as the color combination ratio adjustment coefficient $\omega$ yields the evaluation function $J_m$ which is given by a linear equation for the color combination ratio adjustment coefficient $\omega$ and the restoration strength adjustment coefficient $\mu$. Thus, it can be seen that linear adjustment of the degree of restoration is achievable. The linear adjustment of the degree of restoration can reduce the number of adjustment coefficients (adjustment parameters). There is a further advantageous effect in that users can easily take the correspondences between set values and responses (restored images) during variable adjustment.

Figure 4A:
FIGS. 4A and 4B are second explanatory diagrams of linearity of adjustment coefficients.
Figure 4B:
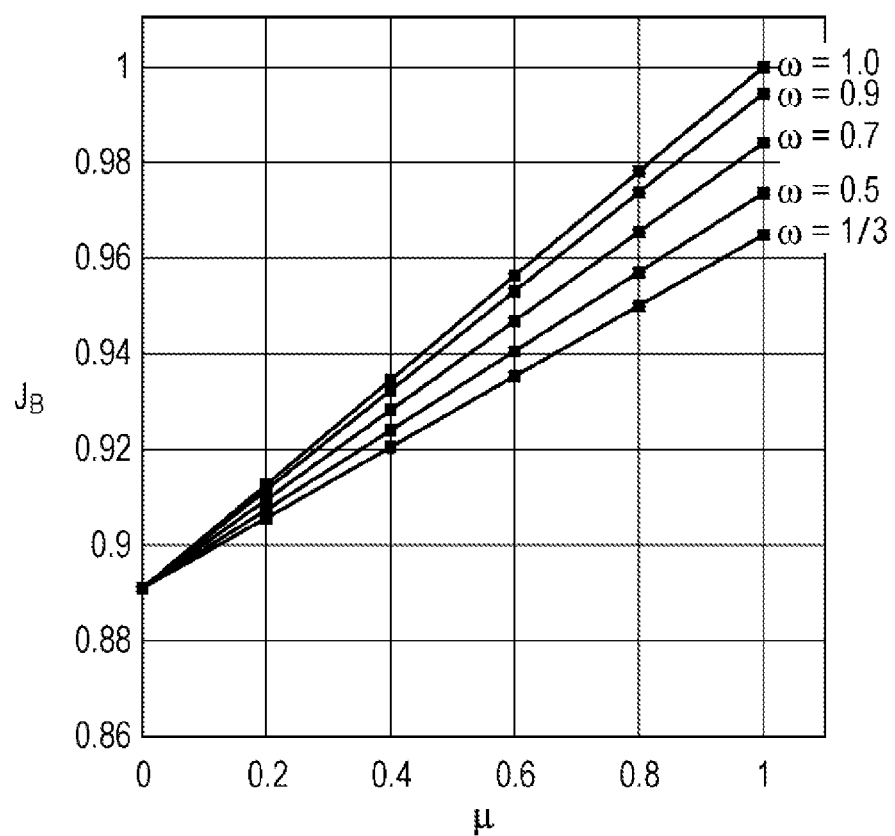

An experimental result of the evaluation of the linearity of the adjustment of the degree of restoration using a test image in FIG. 4A is illustrated in FIG. 4B. It can be found from the result that the linearity illustrated in FIG. 3 was correctly reproduced.

Referring to FIG. 2, a process using both the color combination ratio adjustment coefficient $\omega$ and the restoration strength adjustment coefficient $\mu$ has been described. However, from the relationship illustrated in FIG. 3, even if either adjustment coefficient is used, the effects of reduced color fringing and improved sharpness can be achieved.

Next, a reduction in processing load when the color combination ratio adjustment coefficient $\omega$ or the restoration strength adjustment coefficient $\mu$ (hereinafter, adjustment coefficient) is used will be described using a flowchart for setting an adjustment coefficient in FIG. 5. First, in step S501, the image restoration processing means performs an image restoration process on an input image (photographed image) using a generated image restoration filter or an image restoration filter stored in advance in the storage means or the like. In a step (not illustrated), the difference information generating means subtracts a restored image from the input image, and calculates difference information.

Next, in step S502, the adjustment coefficient setting means sets an adjustment coefficient on the basis of an adjustment coefficient stored for the restored image in advance, an adjustment coefficient selected by a user, or an adjustment coefficient set as correction information in the input image. Then, the correction difference information generating means generates correction difference information on the basis of the difference information and the input image, and the combining means performs an image combining process to combine the correction difference information with the input image to generate a restored image.

In step S503, the restored image is evaluated, and it is determined whether to use the restored image directly as a corrected image (output image) or to change the degree of restoration. If the degree of restoration is to be changed, the process proceeds to step S504, in which the adjustment coefficient setting means changes (sets) an adjustment coefficient.

Then, the image combining process (combining process) is performed again (S502). The determination of step S503 may be performed by a user on the basis of their subjective evaluation by acquiring a determination result input by the input means or the like or may be performed on the basis of the evaluation function of the image stored in advance in the storage means. If it is determined in step S503 that the degree of restoration is not to be changed, the restored image generated in the preceding step is output as an output image.

As described in step S503, if the degree of restoration of the restored image using the image restoration filter generated in step S501 is to be changed, there is no need to return to step S501. That is, there is no need to repeatedly perform the recalculation of an image restoration filter or the convolution process, which imposes a large processing load. Thus, processing load can be reduced.

Another advantageous effect is as follows. With the use of an adjustment coefficient, the degree of restoration can be easily adjusted on a pixel-by-pixel basis. Thus, a higher quality restored image can be acquired.

Figure 6A:
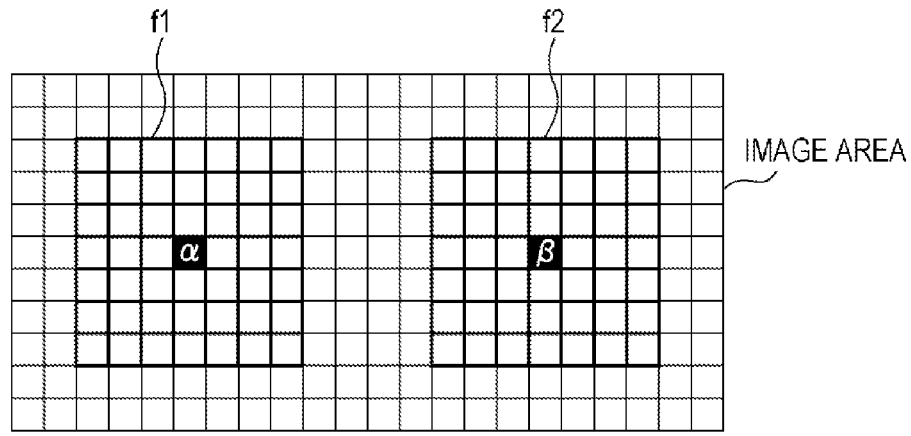
FIGS. 6A to 6C are explanatory diagrams of image restoration filters and the setting of adjustment coefficients for each pixel.
Figure 6B:
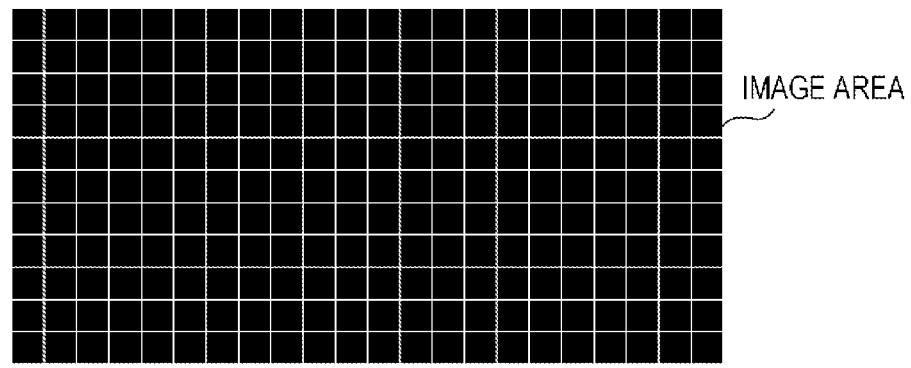

The above effect will be described using FIGS. 6A to 6C. FIG. 6A is a schematic view of a convolution process to be performed on a certain area (image area) having a plurality of pixels using an image restoration filter. In FIG. 6A, an image restoration filter f1 and an image restoration filter f2 having 7×7 pixels are convoluted with black pixels α and β at the center of the respective filters to perform a restoration (recovery) process for the respective center pixels α and β. The image restoration filters f1 and f2 can also be changed in accordance with aberration for each position (certain area) in the image. The image restoration filters f1 and f2 in FIG. 6A are the same image restoration filter. Through the convolution process illustrated in FIG. 6A, the pixel α and the pixel β are corrected to appropriate values. However, if a restoration process is executed using the image restoration filters f1 and f2 which are the same without taking into account the feature values of the pixels, as illustrated in FIG. 6B, the degrees of restoration of the image are made uniform. Even when the pixels α and β correspond to edge portions of the image, a restored image as illustrated in FIG. 6B may be obtained if the image restoration filter is not appropriately changed on a pixel-by-pixel basis. If image restoration filters are to be changed in accordance with the feature values of the pixels α and β, as described previously, a large load is imposed on the process.

Figure 6C:
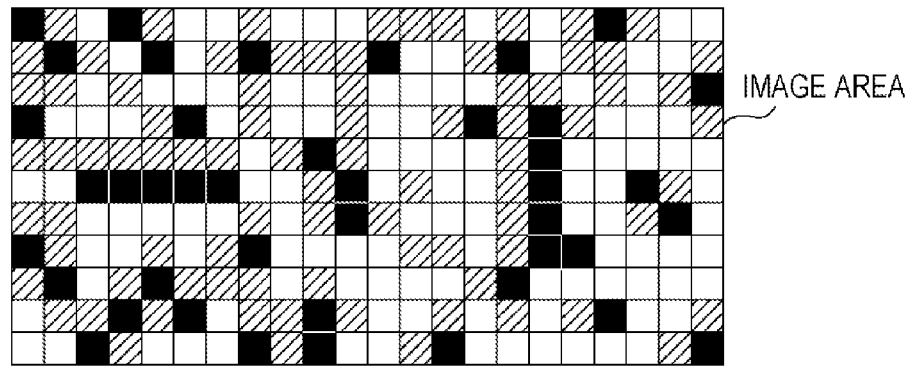

In contrast, as illustrated in FIG. 6C, applying the present invention enables the degree of restoration for each pixel to be easily adjusted, and therefore enables a reduction in a load on the image restoration process. In addition, by changing an adjustment coefficient in accordance with a feature value of a pixel, it is possible to perform a restoration process suitable for aberration of each pixel. Therefore, a high-quality image can be obtained.

As described above, a restoration process based on an image restoration filter which imposes a large processing load is performed for an area having a certain number of pixels or more. And for an area within that area having a smaller number of pixels (one pixel at minimum) than the above number of pixels, the degree of restoration is changed using an adjustment coefficient corresponding to the feature values of the pixels. Therefore, a high-quality image can be obtained with reduced image processing load.

The setting of an adjustment coefficient in accordance with a feature value detected in a feature value detection process 202 illustrated in FIG. 2 will be described hereinafter using a specific example.

(Feature Value Detection Process)

In the feature value detection process 202, a feature value of the input image $g_m$ is detected. Then, adjustment coefficients such as the restoration strength adjustment coefficient $\mu$ and the color combination ratio adjustment coefficient $\omega$ are set in accordance with the detected feature value. Here, the term feature value represents, for example, a pixel value, a luminance value, a difference between pixel values (luminance values), a signal value, a type of image, or the like. The term pixel value represents the value of each pixel of each color component, and the term luminance value represents a value obtained by mixing a plurality of color components with a certain proportion.

The following description will be given in the context of a restoration strength adjustment coefficient $\mu$ as an adjustment coefficient, by way of example. However, in terms of the linearity with the color combination ratio adjustment coefficient $\omega$, the color combination ratio adjustment coefficient $\omega$ can be used instead.

Figure 7A:
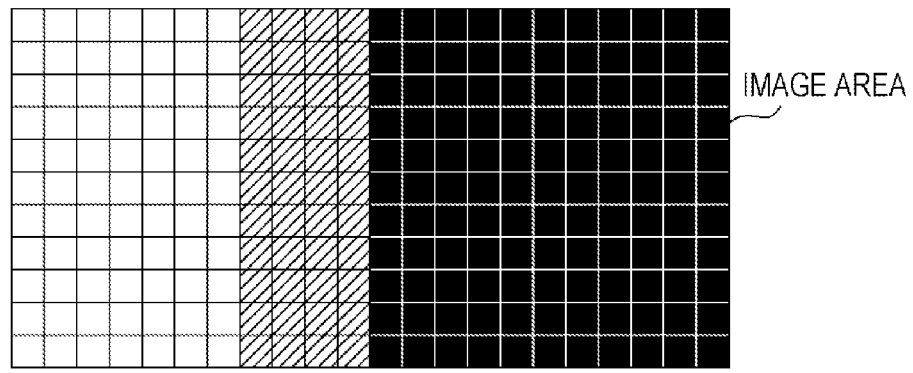
FIGS. 7A to 7C are explanatory diagrams of a feature value of an image.
Figure 7B:
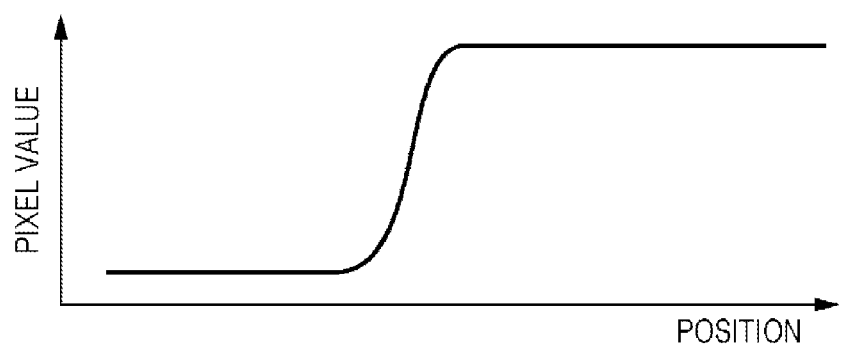
Figure 7C:
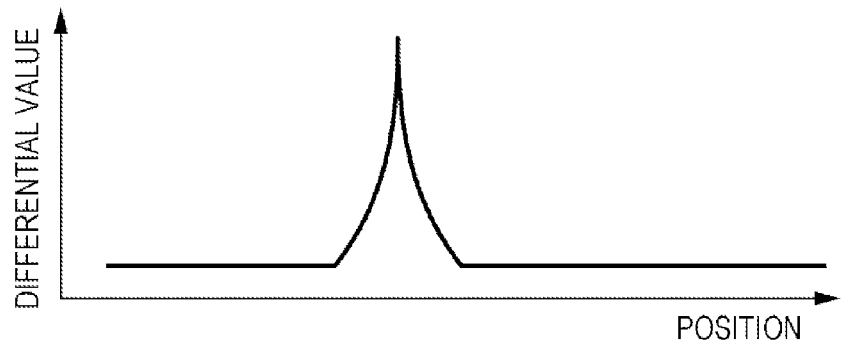

A process to be performed in an edge portion in an image as a specific example of detecting a feature value of an image will be described using FIGS. 7A to 7C. FIG. 7A illustrates a portion of an image, in which pixel values change in the horizontal direction from a solid white part to a solid black part across a shaded part. FIG. 7B illustrates a horizontal cross section of the image. FIG. 7C illustrates a differential value of the cross section in FIG. 7B. FIG. 7C illustrates results of edge extraction using an edge detection filter. It can be seen from FIG. 7C that the solid white area and the solid black area in FIG. 7A represent a flat portion where the pixel values do not change and the shaded part is an edge portion where the pixel values change. The flat portion and the edge portion are examples of feature values. It can also be seen that also in the shaded portion detected as an edge portion, the differential value changes in accordance with the changes of the pixel values. These are also feature values.

The sharpness of the edge portion influences the sharpness of the entire image. Thus, the restoration strength adjustment coefficient $\mu$ is set so that the degree of restoration for the edge portion is increased. In contrast, a non-edge portion having a relatively low color density, in other words, a flat portion, has a small influence on the sharpness of the entire image even if the degree of restoration is increased. Conversely, enhancement of noise in this portion causes ill effects, and therefore the restoration strength adjustment coefficient $\mu$ is set so as to reduce the degree of restoration.

For example, if a difference between pixel values is less than or equal to a preset threshold, the restoration strength adjustment coefficient is set to 0 (zero), and restoration is not performed. If a difference between pixel values is greater than or equal to the threshold, restoration can be performed using an adjustment coefficient determined in accordance with other conditions (such as the color combination ratio adjustment coefficient $\omega$). This process flow will be described below. The threshold may be determined by, for example, multiplying the standard deviation of noise at a certain pixel value by N.

It is to be noted that N can be changed in accordance with the desired image quality. This is based on the concept that no restoration is performed for an area where it is highly probable that a difference between pixel values is buried in noise because, originally, there is no distinction between an object image and noise and restoration is ineffective.

In this way, restoration is not performed for an area of an image where any effect would be unexpected if restoration is performed using an adjustment coefficient in accordance with a feature value. In this case, processing load can be further reduced, compared to when restoration is performed irrespective of the feature value.

Furthermore, the degree of restoration may be controlled using multivariate techniques in accordance with the difference between pixel values instead of using ON/OFF two-stage determination of whether or not to perform restoration based on a threshold. That is, a feature value is used as a pixel value difference between neighboring pixels, and the value of an adjustment coefficient is set in accordance with the pixel value difference. More specifically, if a first pixel value difference is smaller than a second pixel value difference, the adjustment coefficient for the pixels corresponding to the first difference is set to a value smaller than the adjustment coefficient for the pixels corresponding to the second difference.

Therefore, a high-quality image with reduced noise can be obtained with reduced processing load. The term neighboring pixels, as used here, also includes pixels located diagonally to a specific pixel.

Other feature values include a luminance value. If a luminance value is used as a feature value, a portion having a low luminance value has a low SN ratio of the desired image signal to the noise signal. Thus, if the degree of restoration is high, noise is likely to become more noticeable. Thus, the restoration strength adjustment coefficient $\mu$ is set so that the degree of restoration is reduced. Conversely, a portion having a high luminance value has a high SN ratio. Thus, the restoration strength adjustment coefficient $\mu$ is set so that the degree of restoration is increased. That is, the higher the luminance value, the larger the value of the adjustment coefficient to be set. Therefore, noise which may occur in a restored image can be reduced and a high-quality image can be obtained. Here, the SN ratio is a value obtained by dividing a pixel value of an input image by the standard deviation of noise.

In another example, in a portion where the luminance values saturate, the desired image signal is limited (clipped) at the upper limit of the range of the image pickup element, and the aberration state is largely different from an expected state. Thus, false color is likely to occur. When the feature value acquiring means detects a pixel whose luminance value saturates, an adjustment coefficient is set so that the degree of restoration for that pixel is reduced. A coefficient value may be set to 0 (zero), if necessary, and the saturating portion may be set not to be restored. Conversely, for a pixel whose luminance value does not saturate, a restored image may be generated in accordance with an adjustment coefficient set by the adjustment coefficient setting means. That is, for a pixel whose luminance value saturates, a value smaller than the value of the adjustment coefficient set for a pixel having a pixel value immediately before saturation is reset. It is to be noted that this case of resetting also includes a case where no adjustment coefficient has been set as an initial value in each pixel and an adjustment coefficient is set for a specific pixel after it has been determined whether or not a luminance value saturates.

Therefore, the occurrence of false color in a restored image can be reduced, and a high-quality image can be obtained. The term luminance value immediately before saturation, as used here, is, for example, 254, which is the upper limit of the range of the image pickup element when a pixel value of 255 is a maximum value in an 8-bit image.

Other feature values include image symmetry. If the image pickup system (image pickup optical system) has a manufacturing error, the degree of degradation may differ between bilaterally symmetrical positions in an image, which may appear as blur in the image or its relative difference in color fringing. It is possible to absorb the manufacturing error by setting adjustment coefficients, i.e., the color combination ratio adjustment coefficient $\omega$ and the restoration strength adjustment coefficient $\mu$, in accordance with a change in the amount of blur at a position in the image.

Other feature values include a type of object. The degree of restoration can be adjusted by recognizing an object, in accordance with the type of object. By way of example, some recent digital cameras have a face recognition function. An artifact such as false color occurring in a human face due to image restoration may create a very unnatural image. Therefore, preferably, the degree of restoration is adjusted appropriately. Information obtained by the above image recognition is also one of feature values.

As described above, difference information between a restored image and an input image and an adjustment coefficient for adjusting the difference information are set in accordance with a feature value, thus making it possible to obtain a high-quality image. More specifically, by setting an adjustment coefficient in accordance with a feature value, it is possible to obtain a high-quality image while reducing image processing load.

In FIG. 2, a feature value is detected for each of the R, G, and B color components. However, a feature value may be detected only for the G color component. In addition, an image for which a feature value is to be detected may be an input image or a restored image.

Exemplary Embodiment 1

FIG. 9 illustrates a basic configuration of an image pickup apparatus having an image processing apparatus according to Exemplary Embodiment 1 of the present invention.

An image pickup optical system (image pickup system) 101 forms an object image (not illustrated) on an image pickup element 102. The light focused on the image pickup element 102 is converted into an electrical signal, which is converted into a digital signal by an A/D converter 103. The digital signal is input to an image processing unit 104.

The image processing unit 104 performs various image processing operations, an image restoration process, etc. on the input digital image data (input image). The image processing unit 104 functions as an image restoration processing means, a difference information generating means, a pixel feature value acquiring means, an adjustment coefficient setting means, a correction difference information generating means, and a combining means.

First, the image processing unit 104 obtains, from a state detection unit 107, image pickup state information that is information indicating the state of the image pickup optical system 101 (such as zoom position (focal length), aperture value (aperture diameter), and object distance (focus distance)). The state detection unit 107 may obtain the image pickup state information directly from a system controller 110 or from an image pickup optical system control unit 106 that controls the operation of the image pickup optical system 101.

Next, the image processing unit 104 selects from a storage unit 108 an image restoration filter corresponding to the state of the image pickup optical system 101 obtained from the image pickup state information. Then, the image processing unit 104 uses the selected image restoration filter or an image restoration filter newly generated by correcting the selected image restoration filter in accordance with the image pickup state information to perform an image restoration process on the input image and adjust the degree of restoration in accordance with the adjustment parameter (adjustment coefficient).

Figure 10:
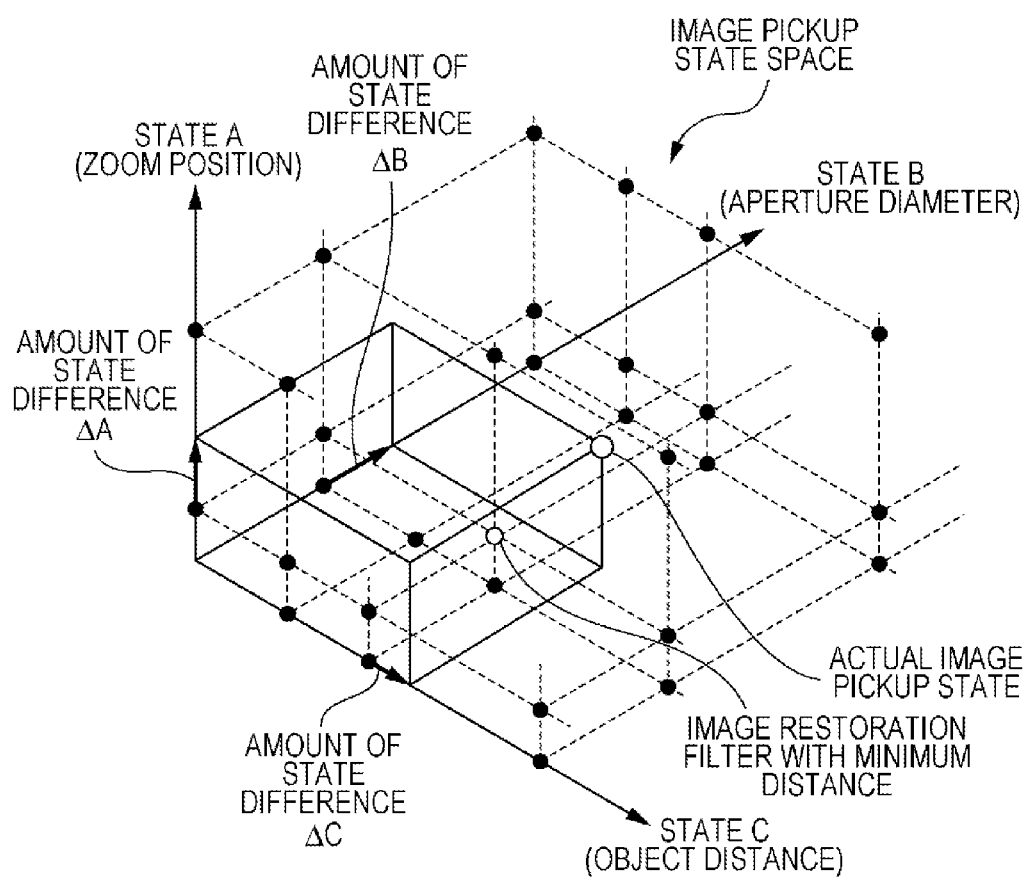
FIG. 10 is an explanatory diagram of the selection and correction of an image restoration filter.

The selection and correction of an image restoration filter will be described using FIG. 10. FIG. 10 schematically illustrates image pickup state information and a plurality of image restoration filters (black circles) stored in the storage unit 108 on the basis of the image pickup state information. The image restoration filters stored in the storage unit 108 are arranged in a discrete manner in an image pickup state space having three image pickup states as axes, that is, focal position (state A), aperture value (state B), and object distance (state C). The coordinates of each point (black circle) in the image pickup state space represent an image restoration filter stored in the storage unit 108. In FIG. 10, the image restoration filters are arranged at grid points along lines perpendicular to the individual image pickup states. However, the image restoration filters may be arranged so as to be located off the grid points. Furthermore, the types of image pickup states are not limited to the focal length, aperture value, and object distance, and the number of states may not necessarily be three. A forth- or higher-order dimensional image pickup state space based on four or more image pickup states may be constructed, and the image restoration filters may be arranged in the image pickup state space in a discrete manner.

In FIG. 10, it is assumed that the image pickup state indicated by the larger white circle is an actual image pickup state detected by the state detection unit 107. If an image restoration filter stored in advance is located at or near the position corresponding to the position of the actual image pickup state, the image restoration filter may be selected and used in the image restoration process. One method for selecting an image restoration filter near the position corresponding to the actual image pickup state is a method of calculating the distance (the amount of difference in image pickup state) in the image pickup state space between the actual image pickup state and each of a plurality of image pickup states at which the image restoration filters are stored, and then selecting the image restoration filter at the shortest distance position. Through the above method, the image restoration filter at the position indicated by the smaller white circle in FIG. 10 is selected.

Other methods include a method of selecting an image restoration filter with weights based on directions in the image pickup state space, that is, a method of selecting the image restoration filter having the highest value of the evaluation function, where the evaluation function is the product of a distance in the image pickup state space and a weighted direction.

Next, a method for generating a new image restoration filter by correcting a selected image restoration filter will be described. In order to correct an image restoration filter, first, the distance (amount of state difference) in the image pickup state space between the actual image pickup state and each of the image pickup states at which the image restoration filters are stored is calculated, and the image restoration filter at the position with the shortest distance (smallest amount of state difference) is selected. With the selection of the image restoration filter having the smallest amount of state difference, the amount of correction of the image restoration filter can be reduced, and an image restoration filter close to the desired image restoration filter under the image pickup state can be generated.

In FIG. 10, the image restoration filter at the position indicated by the smaller white circle is selected. The amounts of state difference ΔA, ΔB, and ΔC between the image pickup states corresponding to the selected image restoration filter and the actual image pickup state are calculated. State correction coefficients are calculated on the basis of the amounts of state difference, and the selected image restoration filter is corrected using the state correction coefficients. Accordingly, the image restoration filter corresponding to the actual image pickup state can be generated.

As another method, a plurality of image restoration filters located near the actual image pickup state are selected and an interpolation process is performed in accordance with the amount of state difference between each of the plurality of image restoration filters and the actual image pickup state. Thus, an image restoration filter suitable for the image pickup state can be generated. Here, the interpolation process may be interpolation based on linear interpolation of the coefficient values of corresponding taps of two-dimensional image restoration filters, polynomial interpolation, spline interpolation, and so forth.

Further, the optical transfer function (OTF) used for the generation of an image restoration filter can be determined by computation using an optical design tool or an optical analysis tool. Furthermore, the actual optical transfer function (OTF) of the image pickup optical system alone or the image pickup apparatus can also be determined by measurement.

Then, the output image processed by the image processing unit 104 is saved in an image recording medium 109 using a predetermined format. The output image is a sharpened image in which the degree of occurrence of false color and the degree of restoration are balanced by the image restoration process. Further, an image subjected to a predetermined correction process for displaying a result of the correction process, or an image that is not subjected to a correction process for high-speed display or that has been subjected to a simplified correction process may be displayed on a display unit 105.

The series of processes performed by the image processing unit 104 described above is controlled by the system controller 110. Further, the driving of the image pickup optical system 101 is controlled by the image pickup optical system control unit 106 that has received an instruction from the system controller 110.

The aperture stop diameter (aperture diameter) is controlled by an aperture 101a. Thus, for a focus lens 101b, the position of the lens is controlled by using an autofocus (AF) mechanism or a manual focus mechanism (not illustrated) in order to perform focus adjustment in accordance with the object distance. The image pickup optical system 101 may include an optical element such as a low-pass filter or an infrared cut filter. However, in a case where the optical element has an influence on the characteristics of the optical transfer function (OTF) of the image pickup optical system 101, an image restoration filter needs to be created by taking the influence of the optical element into account.

For example, if an infrared cut filter is provided, the infrared cut filter has an influence on the point spread function (PSF) of each of the RGB channels, which is the integral value of the PSFs of the spectral wavelengths, particularly, on the PSF of the R channel. Thus, consideration needs to be taken at the time when an image restoration filter is created.

The image pickup optical system 101 may be provided integrally with the body of the image pickup apparatus, or may be provided in a replaceable manner.

Further, since the optical transfer function (OTF) changes in accordance with the image height (position in the image) of the image pickup optical system 101 even under the same image pickup state, it is preferable that an image restoration process be changed and performed in accordance with the image height. Specifically, an image restoration filter is scanned for each pixel of an image while a convolution process is being performed, and an image restoration filter may be changed for each certain area.

An image restoration process (image processing method) according to this exemplary embodiment is executed by the image processing unit 104 illustrated in FIG. 1.

Figure 11:
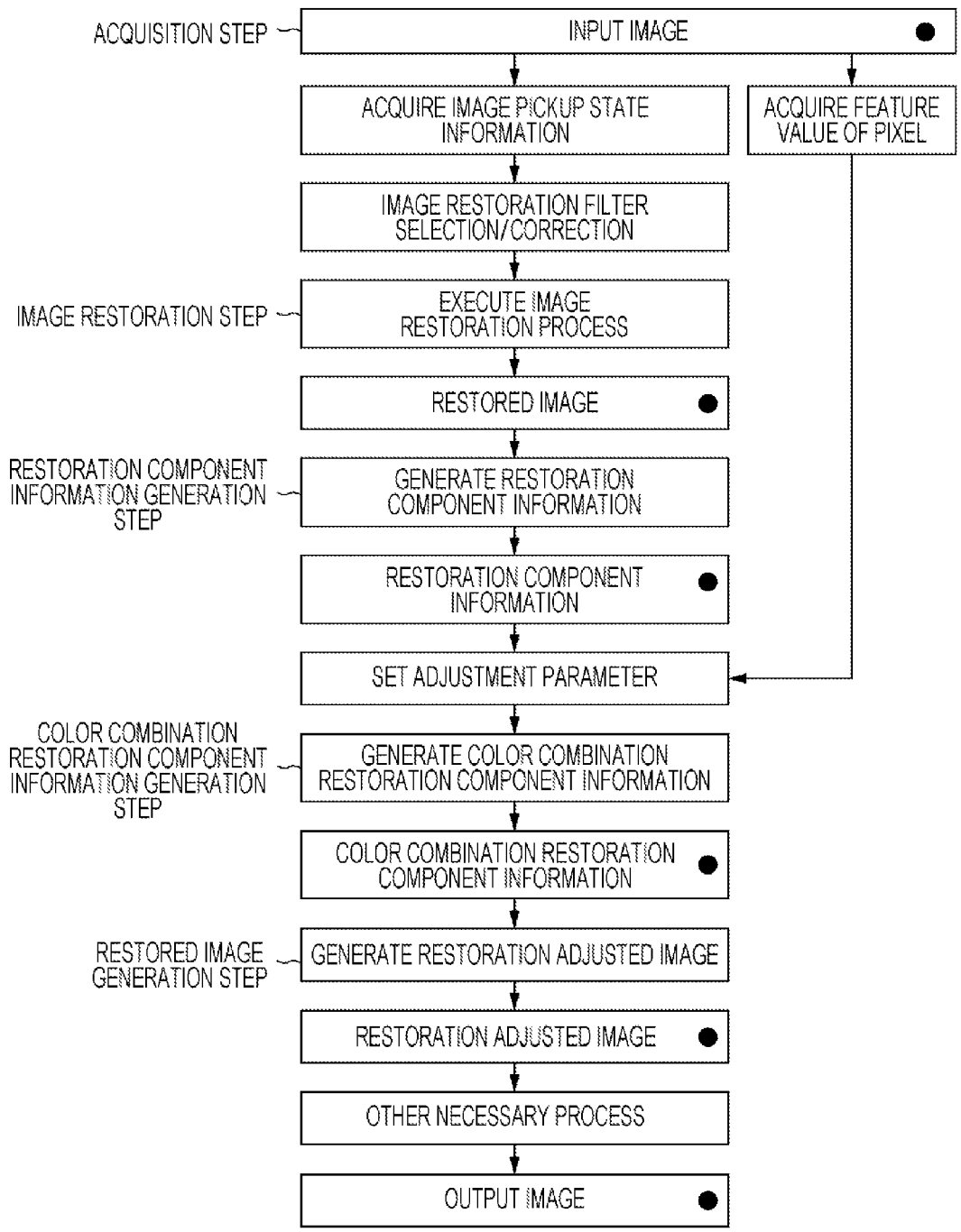
FIG. 11 is a flowchart illustrating an image processing procedure according to Exemplary Embodiment 1.

FIG. 11 illustrates a specific flowchart of an image restoration process (image processing method) according to this exemplary embodiment which is executed by the image processing unit 104. In FIG. 11, black circles represent pixel data of an image or the like, and others represent processes.

The image processing unit 104 acquires an input image in an acquisition step (image acquiring step). Next, the image processing unit 104 obtains image pickup state information from the state detection unit 107, and selects an image restoration filter from the storage unit 108 in accordance with the image pickup state. Then, in an image restoration step (image restoration processing step), the image processing unit 104 performs a restoration process on the input image using the image restoration filter to generate a restored image. The image processing unit 104 further acquires a feature value from the input image. The step of acquiring a feature value may be performed in parallel to the acquisition of image pickup state information, as illustrated in FIG. 11, or the step of acquiring a feature value may be inserted before the acquisition of image pickup state information.

Then, in a difference information generation step (restoration component information generation step), the image processing unit 104 generates restoration component information from the difference between the input image and the restored image. The difference information is determined on a pixel-by-pixel basis. Then, the image processing unit 104 sets an adjustment coefficient as a color combination ratio adjustment coefficient ω or a restoration strength adjustment coefficient μ. The adjustment coefficient is set in accordance with the acquired feature value.

Next, in a correction difference information generation step (a color combination restoration component information generation step), the image processing unit 104 calculates difference information for the input image in accordance with the adjustment coefficient to generate correction difference information. Specifically, a pixel value obtained by multiplying each pixel value in the difference information by a restoration strength adjustment coefficient μ is added to the input image on a pixel-by-pixel basis to obtain correction difference information.

Then, in a combining step, the image processing unit 104 combines the correction difference information with the input image to generate a restoration adjusted image.

Next, the image processing unit 104 performs other processes necessary for image formation, and outputs a restored image (corrected image). Here, the "other processes" include a color interpolation process (demosaicing process) if the corrected image is in the state of a mosaic image, and further include shading correction (amount-of-ambient-light correction), and distortion aberration correction. Various image processing operations including the other processes described here can be inserted, if necessary, before, after, or in the middle of the flow described above.

The image processing unit 104 includes at least a calculation unit and a temporary storage unit (buffer). The image processing unit 104 writes (stores) and reads an image to and from the temporary storage unit, if necessary, in each of the above image processing steps. The storage unit 108 may be used as the temporary storage unit.

Here, FIG. 8A illustrates a flowchart of, as a more specific example of a process according to a feature value of an image, a process for detecting an edge portion in an image using an edge detection filter and changing adjustment coefficients in accordance with an edge portion and a non-edge portion.

In step S801, an input image is acquired. In step S802, a restoration process is performed on the input image acquired in S801 using an image restoration filter D801 written (stored) in a memory to generate a restored image D802, and the restored image D802 is written in the memory. Next, in step S803, restoration component information D803 is generated from the difference between the restored image and the input image, and is written in the memory. Then, in step S804, the adjustment of the degree of restoration at position (x, y) in the input image is started. Then, in step S805, it is determined for each position in the input image whether or not the position is in an edge portion. If the position is in an edge portion, the process proceeds to step S806, in which the restoration strength adjustment coefficient is set to μ=1.0. If it is determined in step S805 that the position is not in an edge portion, the process proceeds to step S807, in which the restoration strength adjustment coefficient is set to μ=0.1 and is written in the memory. Then, in step S809, the restoration strength adjustment coefficient μ (D804) for the position is read from the memory, and the input image and restoration component information multiplied by μ are combined. In step S810, it is determined whether or not the entire image has been subjected to the changing of the restoration strength adjustment coefficient in accordance with the feature value. If the entire image has adjusted, a restoration adjusted image D805 is written in the memory. Then, the process ends. If the entire image has not been adjusted, the process returns to step S804. In this example, a restored image, restoration component information, a restoration strength adjustment coefficient, and a restoration adjusted image are held in the memory at desired time. The memory may be changed to an internal memory, an external memory, or the like. While the restoration strength adjustment coefficient is divided into two stages in accordance with whether or not a position is in an edge portion, the restoration strength adjustment coefficient may be divided into multiple stages in accordance with edge intensity.

Figure 8B:
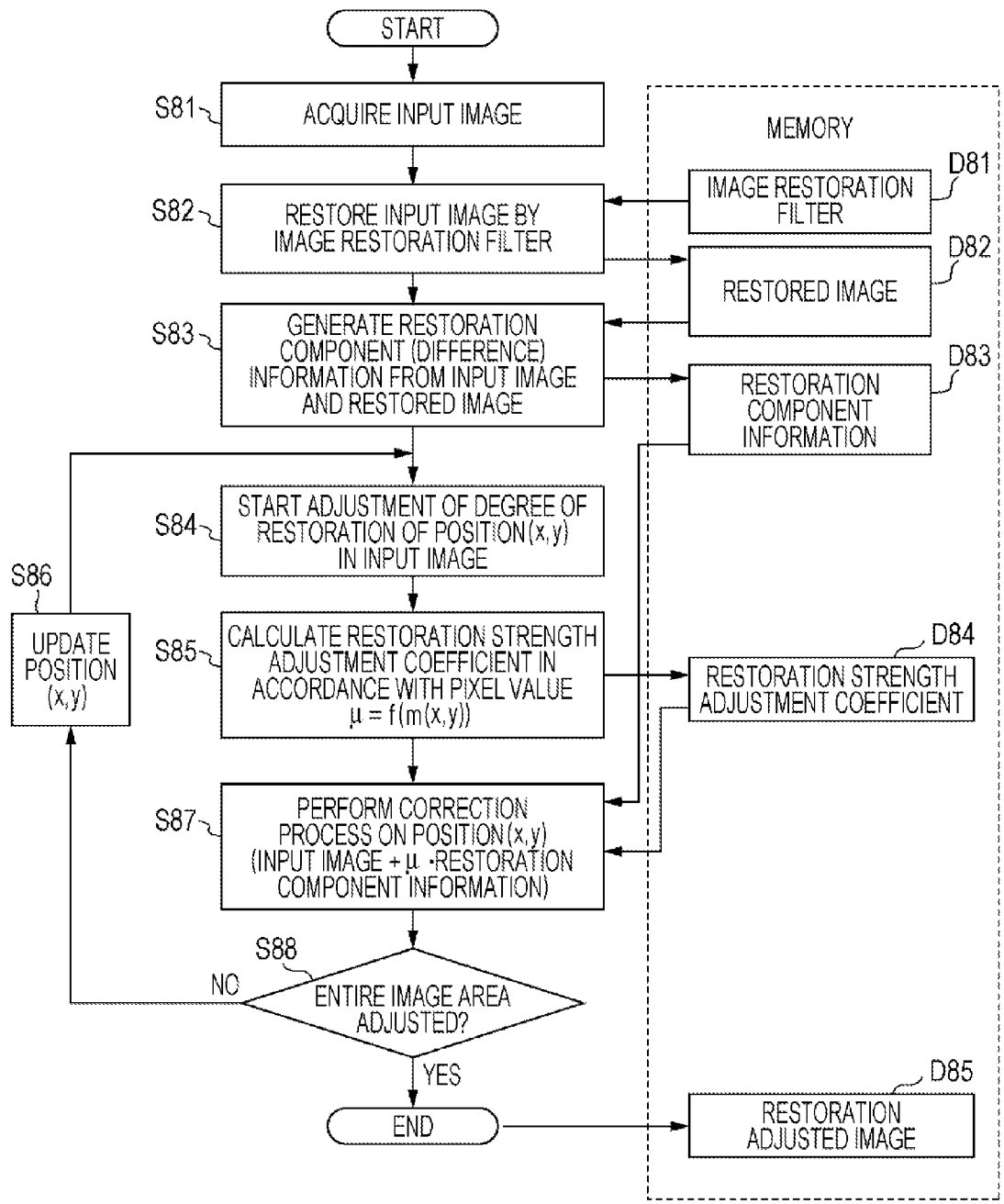
FIG. 8B is a flowchart illustrating an example of an image processing procedure based on a feature value of a pixel.

FIG. 8B illustrates a flowchart for changing an adjustment coefficient in accordance with the pixel value or luminance. The process is started, and, in step S81, an input image is acquired. In step S82, a restoration process is performed on the input image using an image restoration filter D81 stored in a memory to generate a restored image D82, and the restored image D82 is written in the memory. In step S83, restoration component information D83 is generated from the difference between the restored image and the input image, and is written in the memory. In step S85, the pixel value at position (x, y) in the input image is represented by m(x, y), and a restoration strength adjustment coefficient μ is calculated using a function f. The function f is a function in which, for example, for an 8-bit image with gradations of 0 to 255, μ=0 if the pixel value is 255 and luminance saturates, μ=1 if the pixel value 250, and μ=0 if the pixel value is 0. Alternatively, a conversion table between pixel values and restoration strength adjustment coefficients may be used instead of the function f. Then, in step S87, a correction process is performed for adding up restoration component information obtained by multiplying the input image by μ in step S85. Then, in step S88, it is determined whether or not the entire image has been adjusted. If it is determined that the entire image has been adjusted in accordance with the feature value, a restoration adjusted image D85 is written in the memory. Then, the process ends. If it is determined that the entire image has not been adjusted, the process proceeds to step S86, in which the position of the pixel is changed. Then, the process proceeds to step S84 again, and the processing from step S85 is repeatedly performed.

In the "other processes" described above, if distortion aberration correction or chromatic aberration of magnification correction is performed, the magnification of the image is changed. Thus, a pixel interpolation process is required. If a pixel interpolation process is performed, periodic degradation of sharpness occurs in accordance with the amount of correction. The cycle of degradation and the amount of degradation can be obtained in advance from the characteristics of correction such as distortion aberration correction or chromatic aberration of magnification correction. Accordingly, by setting the value of the adjustment coefficient in accordance with the characteristics of the correction, it is possible to correct an unevenness of sharpness caused by the pixel interpolation process. Specifically, the image processing unit 104 sets a restoration strength adjustment coefficient μ in accordance with the characteristics of the correction for each pixel or for each certain area in the image. The characteristics of correction for a process (distortion aberration correction, chromatic aberration of magnification correction, etc.) for performing the pixel interpolation process are also feature values.

While preferred relationships between processing steps and the processes to be taken into account have been described, if there is a constraint on the order of the processing steps from a different viewpoint, the relationships and processes are not limited to those. The order of the processing steps or the presence/absence of each processing step may be changed in accordance with the constraint conditions for processing or the required image quality.

Exemplary Embodiment 2

Figure 12A:
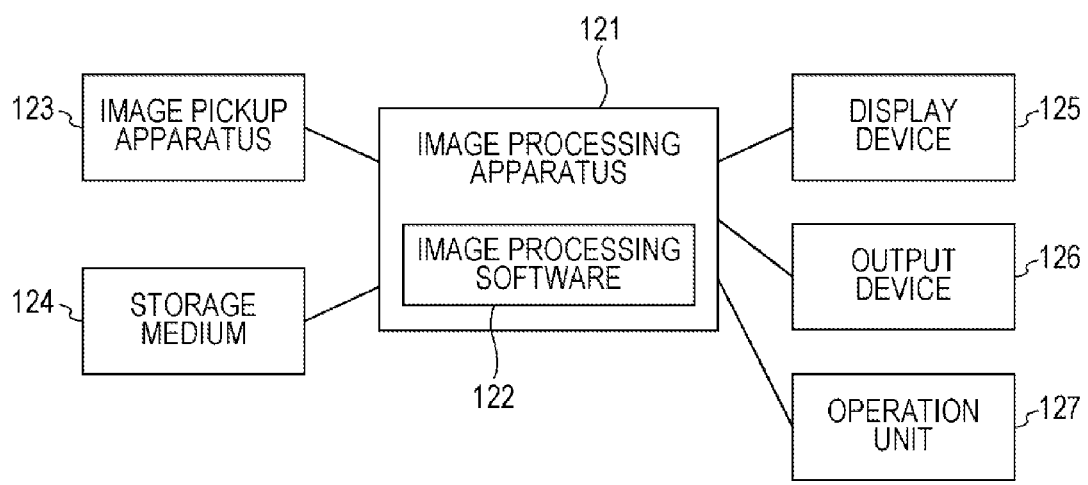
FIGS. 12A and 12B are explanatory diagrams of an image processing system according to Exemplary Embodiment 2 of the present invention.

FIG. 12A illustrates a configuration diagram of an image processing system according to Exemplary Embodiment 2 of the present invention. An image processing apparatus 121 is composed of an information processing apparatus, and has image processing software (image processing program) 122 for causing the information processing apparatus to execute the image processing method described in Exemplary Embodiment 1.

An image pickup apparatus (image pickup device) 123 includes a camera, a microscope, an endoscope, a scanner, and the like. A storage medium 124, such as a semiconductor memory, a hard disk, or a server on a network, stores images (photographed image data) generated by image pickup.

The image processing apparatus 121 acquires image data from the image pickup apparatus 123 or the storage medium 124, and outputs output image (corrected image) data on which certain image processing has been performed to at least one of an output device 126, the image pickup apparatus 123, and the storage medium 124. Furthermore, the output destination may be set to a built-in storage unit of the image processing apparatus 121, and the output image data can be saved in the storage unit. Examples of the output device 126 include a printer. A display device 125 that is a monitor is connected to the image processing apparatus 121, and a user can perform an image processing work and can evaluate the restoration adjusted image (output image) through the display device 125. The image processing software 122 has, in addition to the image restoration processing function and the degree-of-restoration adjustment function, a development function and any other image processing function, if necessary.

Figure 12B:
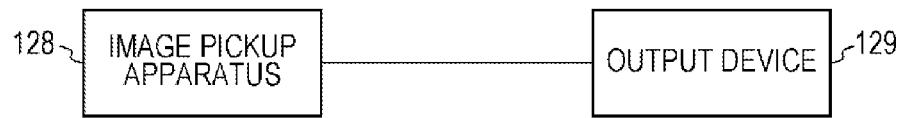

FIG. 12B illustrates the configuration of another image processing system. As in Exemplary Embodiment 1, if an image pickup apparatus (image pickup device) 128 alone performs the image processing in Exemplary Embodiment 1, the image pickup apparatus 128 can output a restoration adjusted image directly to an output device 129.

Furthermore, the output device 129 may have an image processing apparatus that executes the image processing method in Exemplary Embodiment 1, and can therefore set an adjustment coefficient in accordance with the feature value of the image to adjust the degree of restoration. Furthermore, the degree of restoration is adjusted in accordance with the degradation characteristics of an output image of the output device 129. Therefore, a higher quality image can be provided.

Figure 13:
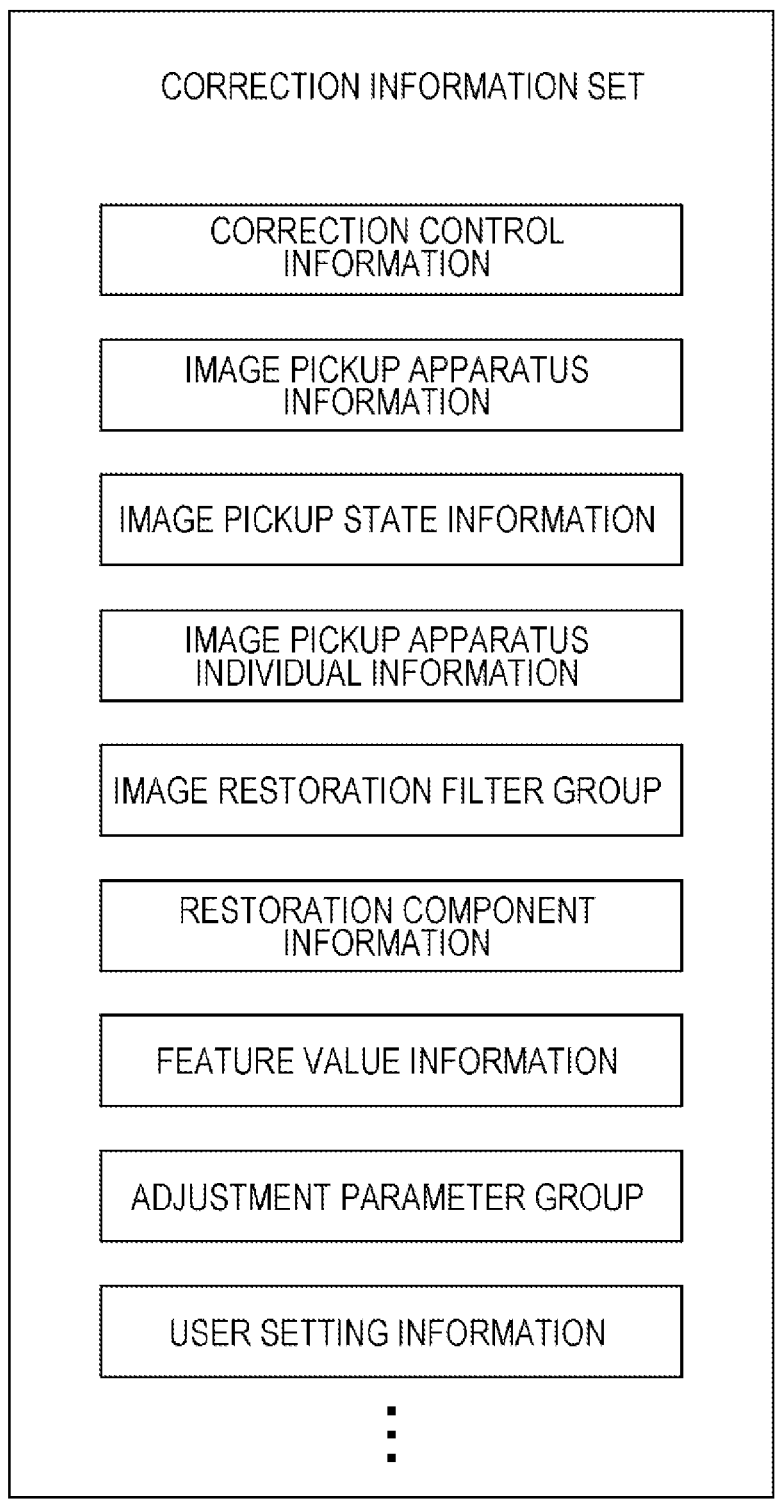
FIG. 13 is an explanatory diagram of correction information.

Here, the content of correction data for performing image processing including an image restoration process and the adjustment of the degree of restoration, and the delivery of the correction data will be described. FIG. 13 illustrates the content of the correction data. A correction information set includes the following information regarding correction.

"Correction Control Information"

Correction control information includes setting information indicating which of the image pickup apparatus 123, the image processing apparatus 121, and the output device 126 is to perform a restoration process and a degree-of-restoration adjustment process, and selection information for selecting data to be transmitted to another device in accordance with the setting information. For example, if the image pickup apparatus 123 performs only a restoration process and the image processing apparatus 121 adjusts the degree of restoration, it is not necessary to transmit an image restoration filter to the image processing apparatus 121 but it is necessary to transmit at least a photographed image and a restored image or restoration component information (difference information).

"Image Pickup Apparatus (Image Pickup Device) Information"

Image pickup apparatus information is identification information about the image pickup apparatus 123 corresponding to the name of the product. If the lens and the camera body are replaceable, the identification information includes the combination of them.

"Image Pickup State Information"

Image pickup state information is information regarding the state of the image pickup apparatus 123 during photographing. Examples of the image pickup state information include the focal length, aperture value, object distance, ISO sensitivity, and white balance setting.

"Image Pickup Apparatus (Image Pickup Device) Individual Information"

Image pickup apparatus individual information is identification information about an individual image pickup apparatus in contrast with the image pickup apparatus information described above. Due to the non-uniform manufacturing errors, the optical transfer function (OTF) of the image pickup apparatus varies from one entity to another. The image pickup apparatus individual information is effective information to set an individually optimum degree-of-restoration adjustment parameter. The degree-of-restoration adjustment parameter includes the restoration strength adjustment coefficient μ and the color combination ratio adjustment coefficient ω.

"Image Restoration Filter Group"

An image restoration filter group is a set of image restoration filters used in the image restoration process. If an apparatus that performs an image restoration process includes no image restoration filters, it is necessary to transmit an image restoration filter from a different apparatus (device).

"Feature Value Information"

Feature value information is information corresponding to a position in an image, such as whether or not the position is in an edge portion, edge intensity, whether or not luminance saturates, pixel value, luminance value, pixel value for each color component, hue, and saturation. The feature value information is transmitted between apparatuses, thus enabling a different apparatus (device) to detect a feature value of the image and adjust the degree of restoration in accordance with the feature value.

"Restoration Component Information (Difference Information)"

If an image restoration process has already been performed and restoration component information has been generated, the photographed image and the restoration component information may be transmitted between apparatuses (devices) so that a different apparatus (device) can adjust the degree of restoration.

"Adjustment Parameter Group"

An adjustment parameter group is a set of a color combination ratio adjustment coefficient ω and a restoration strength adjustment coefficient μ. As described above, the color combination ratio adjustment coefficient ω and the restoration strength adjustment coefficient μ can be changed in accordance with the position in the image. The color combination ratio adjustment coefficient ω and the restoration strength adjustment coefficient μ can also be changed in accordance with the photographic state. Data of the adjustment parameter group may be table data of adjustment coefficients themselves, or may be a function for determining an adjustment coefficient.

"User Setting Information"

User setting information is an adjustment parameter for adjusting the degree of restoration in accordance with user preference, or a function for correcting the adjustment parameter. A user can variably set the adjustment parameter, and can always obtain their desired output image as an initial value by using the user setting information. Further, in the user setting information, it is preferable that the most favorite sharpness among records with which the user has determined an adjustment parameter be updated by using the learning function.

Furthermore, the provider (vendor) of the image pickup apparatus can also provide preset values corresponding to several sharpness patterns via a network.

The correction information set described above is preferably attached to an individual piece of image data. Attaching necessary correction information to image data allows an apparatus or device including an image processing apparatus to perform an image restoration process and adjust the degree of restoration. In addition, the content of the correction information set can be selected automatically and manually, if necessary. For example, when a different apparatus is to perform a degree-of-restoration adjustment process, if the correction information set includes a restored image and restoration component information (difference information), the image restoration filter group is basically unnecessary.

The present invention is not to be limited to the foregoing embodiments, and a variety of changes and modifications can be made without departing from the spirit and scope of the present invention. Therefore, the following claims are appended to clearly define the scope of the present invention.

The present invention has an advantage in that a high-quality image can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   an image restoration processing unit configured to perform a restoration process on an input image and generate a restored image;
   a difference information generating unit configured to calculate difference information between the restored image and the input image;
   an adjustment coefficient setting unit configured to be capable of setting a plurality of different adjustment coefficients for the input image;
   a correction difference information generating unit configured to generate correction difference information on the basis of the adjustment coefficients and the difference information; and
   a combining unit configured to combine the correction difference information with the input image and generate a restoration adjusted image.

2. The image processing apparatus according to claim 1, further comprising a feature value acquiring unit configured to acquire a feature value of the input image,
   wherein the values of the adjustment coefficients are set in accordance with the feature value.

3. The image processing apparatus according to claim 2, wherein the feature value is a luminance value of a pixel, and
   in case where the feature value of a first pixel is larger than the feature value of a second pixel,
   the adjustment coefficients of the first pixel are set to values larger than the adjustment coefficients of the second pixel.

4. The image processing apparatus according to claim 2, wherein the feature value is a luminance value of a pixel, and in case where the luminance value of a specific pixel saturates,
   the adjustment coefficients of the specific pixel are reset to values that are smaller than values of adjustment coefficients set for the specific pixel.

5. The image processing apparatus according to claim 1, wherein in case where the input image has a first color component and a second color component,
   the adjustment coefficients include a coefficient that defines a mixing ratio of the difference information about the first color component and the difference information about the second color component, and the correction difference information about the first color component is generated in accordance with the coefficient.

6. The image processing apparatus according to claim 1, wherein the adjustment coefficients include a coefficient that defines an amount of calculation of the difference information for the input image.

7. An image pickup apparatus comprising:
   an image pickup element that acquires as an input image an object image that is formed through an image pickup system;
   an image restoration processing unit configured to perform a restoration process on the input image and generate a restored image;
   a difference information generating unit configured to calculate difference information between the restored image and the input image;
   an adjustment coefficient setting unit configured to be capable of setting a plurality of different adjustment coefficients for the input image;

a correction difference information generating unit configured to generate correction difference information on the basis of the adjustment coefficients and the difference information; and a combining unit configured to combine the correction difference information with the input image and generate a restoration adjusted image.

8. A non-transitory computer-readable recording medium storing a computer-executable program that causes an information processing apparatus to execute operations comprising:

performing a restoration process on an input image and generating a restored image;

calculating difference information between the restored image and the input image;

setting a plurality of different adjustment coefficients for the input image;

generating correction difference information on the basis of the adjustment coefficients and the difference information; and combining the correction difference information with the input image and generating a restoration adjusted image.

9. An image processing method comprising:

a step of performing a restoration process on an input image and generating a restored image;

a step of calculating difference information between the restored image and the input image;

a step capable of setting a plurality of different adjustment coefficients for the input image;

a step of generating correction difference information on the basis of the adjustment coefficients and the difference information; and a step of combining the correction difference information with the input image and generating a restoration adjusted image.

* * * * *